(No Model.)

R. HEWSON.
WATER WHEEL.

No. 292,431. Patented Jan. 22, 1884.

Witnesses,
Geo. H. Strong.

Inventor,
Robt Hewson
By Dewey & Co.
Attorneys

UNITED STATES PATENT OFFICE.

ROBERT HEWSON, OF SAN FRANCISCO, CALIFORNIA, ASSIGNOR TO THE GLOBE MANUFACTURING COMPANY, OF SAME PLACE.

WATER-WHEEL.

SPECIFICATION forming part of Letters Patent No. 292,431, dated January 22, 1884.

Application filed April 30, 1883. (No model.)

*To all whom it may concern:*

Be it known that I, ROBERT HEWSON, of San Francisco, county of San Francisco, State of California, have invented an Improved Water-Wheel; and I hereby declare the following to be a full, clear, and exact description thereof.

My invention relates to certain improvements in water wheels or motors; and it consists of peculiarly-formed buckets and a case having a diaphragm with inclined discharge-holes so placed with reference to the wheel that the first impulse will be given by the momentum of the water striking the front portions of the buckets, while the water escaping through the rear portions of the buckets gives a reactionary force; and, also, in a means for regulating and controlling the flow of water through the wheel, as will be more fully explained by reference to the accompanying drawings, in which—

Figure 1:
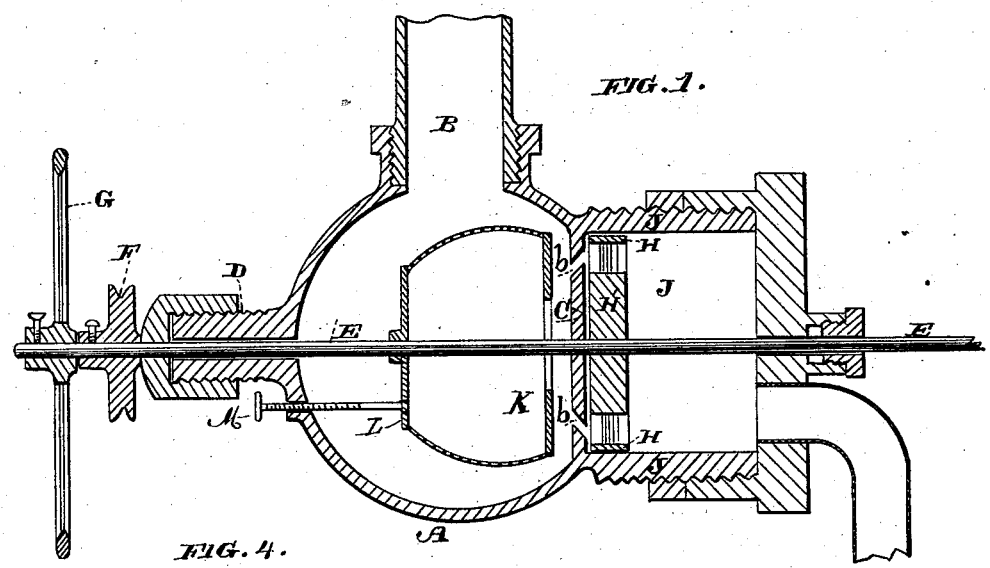
Figure 2:
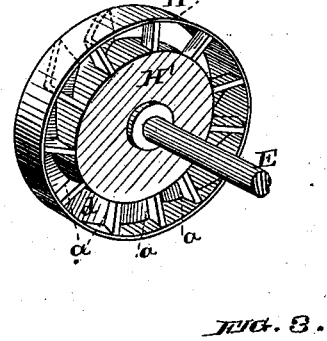
Figure 3:
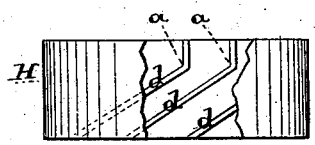

Figure 1 is a section of the case and the wheel. Fig. 2 is a perspective view of the wheel from below. Fig. 3 is a side view, with a portion of the outer part broken away to show the buckets. Fig. 4 is a rear perspective view of the wheel.

A is the case within which my wheel is mounted. The main chamber, into which water is first received from the inlet-pipe B, is shown as globular in form, having a diaphragm, C, at one side, and a stuffing-box, D, at the opposite side. The shaft E of the water-wheel passes through the center of this diaphragm, across the chamber, and out through the stuffing-box D, and has fixed to its outer end a pulley, F, by which power may be communicated. A balance-wheel, G, is also fixed to this shaft, which greatly steadies the action of the wheel when running. The water-wheel is fixed to the shaft E, close to the diaphragm C, and upon the opposite side from the chamber A. The cylindrical portion J of the case surrounds it as closely as possible without friction, and connects with the discharge-pipe. The wheel is composed of an outer and an inner rim, H H', of considerable depth, and the buckets are fixed between these rims. Each bucket is formed of a front portion, *a*, and a rear portion, *d*, which are joined in V shape, as shown in Fig. 3, so that the full force and momentum of the water received through the jet-tubes or openings *b* in the diaphragm C will act directly to drive the wheel, as in that class known as "hurdy-gurdy wheels." These jet-holes *b* are made at intervals around the diaphragm C, and are inclined, so as to open exactly opposite the center of the buckets. They thus act as a series of independent jet-tubes discharging the water under a head or pressure into the buckets, so as to drive the wheel by direct force. In order to free the wheel rapidly and to obtain all the power of the escaping water by reactionary force, the parts *d* of the buckets incline backward, as shown, and the water rushing out through them will assist to rotate the wheel and add to its power.

K is a disk or gate by which the openings *b* may be closed entirely, or the flow regulated at will. This gate is connected with a disk, L, which slides upon the shaft E, and a screw, M, with a milled head, outside the case A, serves to open or close the valve.

This wheel is designed for light work—such as driving sewing and other small machines—and the inlet-pipe is intended to be screwed directly upon a service cock or faucet, the shaft thus lying horizontally, and the belt from the pulley F may lead directly to the machine.

Having thus described my invention, what I claim as new, and desire to secure by Letters Patent, is—

1. The case A, with its inlet-pipe B, and having the flat diaphragm C, with the inclined water-discharge tubes or openings *b* made through it, in combination with a wheel consisting of the outer and inner rims, H H', having a single series of buckets between them, with front parts, *a*, and rear parts, *d*, substantially as herein described.

2. In a water-wheel, a case having an inlet-pipe, through which water is admitted under pressure, and the inclined discharge tubes or openings *b*, in combination with a wheel mounted upon a horizontal shaft, so as to revolve within the case, and having the portion $a$ of the buckets constructed so as to be driven by the impact or momentum of the water, while the portion $d$ is inclined or reactionary, substantially as herein described.

3. The combination, in a water-wheel, of a case adapted to receive water under pressure, a flat diaphragm upon one side, with inclined or angular discharge-openings around its periphery, a water-wheel having buckets corresponding with these openings formed of front and rear plates, and revolving in close proximity to the outside of the diaphragm, and a gate within the case, with mechanism to move it to or from the diaphragm and discharge-openings, substantially as herein described.

In witness whereof I hereunto set my hand.

ROBERT HEWSON.

Witnesses:
S. H. NOURSE,
C. D. COLE.